United States Patent
Dringenberg (10) Patent No.: US 9,004,521 B2
(45) Date of Patent: Apr. 14, 2015

(54) BALL MOUNT HOLDER ASSEMBLY

(71) Applicant: Steven A. Dringenberg, Camino, CA (US)

(72) Inventor: Steven A. Dringenberg, Camino, CA (US)

(*) Notice: Subject to any disclaimer, the term of this patent is extended or adjusted under 35 U.S.C. 154(b) by 0 days.

(21) Appl. No.: 14/044,106

(22) Filed: Oct. 2, 2013

(65) Prior Publication Data

US 2014/0091563 A1  Apr. 3, 2014

Related U.S. Application Data

(60) Provisional application No. 61/709,248, filed on Oct. 3, 2012.

(51) Int. Cl.
*B60D 1/14* (2006.01)
*B60D 1/52* (2006.01)

(52) U.S. Cl.
CPC ........................................ *B60D 1/52* (2013.01)

(58) Field of Classification Search
CPC .............. B60D 1/14; B60D 1/46; B60D 1/02; B60D 1/07
USPC ............. 280/491.5, 490.1, 406.2, 495, 415.1, 280/416.1, 491.4
See application file for complete search history.

(56) References Cited

U.S. PATENT DOCUMENTS

| | | | | |
|---|---|---|---|---|
| 4,157,189 A | * | 6/1979 | Poley | 280/490.1 |
| 5,702,118 A | * | 12/1997 | Hanson et al. | 280/491.5 |
| 6,315,316 B1 | * | 11/2001 | Wyant | 280/415.1 |
| 6,536,794 B2 | * | 3/2003 | Hancock et al. | 280/491.5 |
| 6,641,200 B2 | | 11/2003 | Rusu | 296/100.07 |
| 6,979,015 B1 | * | 12/2005 | Eberle | 280/416.1 |
| 7,055,844 B1 | | 6/2006 | Bostedt | 280/491.5 |
| 7,156,433 B2 | * | 1/2007 | Evans | 293/120 |
| 7,234,191 B2 | * | 6/2007 | Finley | 280/415.1 |
| 7,677,514 B1 | | 3/2010 | Palmer | 248/250 |
| 7,971,896 B2 | | 7/2011 | Hughes et al. | 280/495 |
| 8,231,035 B1 | | 7/2012 | Michael et al. | 224/403 |
| 8,308,183 B1 | * | 11/2012 | McElhinney, Jr. | 280/491.5 |

* cited by examiner

*Primary Examiner* — Hau Phan
(74) *Attorney, Agent, or Firm* — Renner Kenner Greive Bobak Taylor & Weber (57) ABSTRACT

A ball mount holder assembly for mounting to a carrying device includes a body having opposed sides and a stake flange that extends substantially perpendicularly from one of the opposed sides that is adapted to be secured to a surface. A pin flange extends substantially perpendicularly from an opposite one of the opposed sides and in a direction opposite the stake flange and is adapted to receive and carry a ball mount.

11 Claims, 10 Drawing Sheets

BALL MOUNT HOLDER ASSEMBLY

CROSS-REFERENCE TO RELATED APPLICATIONS

This application claims priority of U.S. Provisional Application Ser. No. 61/709,248 filed Oct. 3, 2012, which is incorporated herein by reference.

TECHNICAL FIELD

Generally, the present invention is directed to ball mount holders. Specifically, the present invention is directed to a ball mount holder assembly that is adaptable to different mounting locations and is also adapted to accommodate different sizes of ball mounts.

BACKGROUND ART

Generally, trailer hitches are used for connecting cars and/or trucks to wheeled objects that are to be towed. These objects include, but are not limited to, boats, trailers and other wheeled objects that are to be pulled by a towing vehicle. The towing vehicle may have a permanent receiver type hitch installed with a rearward facing opening. Typically, the hitch has a mounting tube underneath the body of the vehicle and secured to the vehicle frame. The end of the mounting tube is somewhat recessed under the vehicle and then a removable ball mount is inserted into and secured to the mounting tube by a pin or the like, whereupon the wheeled object is secured to a ball mount. The removable ball mount typically consists of a length of a square or rectangular bar where one end of the bar is received in the rearward facing opening of the hitch. The other end of the bar carries an appropriately sized ball.

In order to accommodate various size loads, the receiver type hitches may be of different sizes. Standard insertion tube sizes and respective hitch openings are 1¼ inch, 2 inch and 2½ inch square, although other sizes may be utilized. The mounting tubes may also utilize different size mounting pins, wherein the standard pin sizes are ½ inch diameter or ⅝ inch diameter. The pin is received in aligned cross-openings in the mounting tube and the rectangular bar.

When not in use, the installed ball mount extends from the vehicle. As a result, people tend to walk into these extended ball mounts if they are unaware, and bump their shins. The driver of the vehicle may also forget that the detachable ball mount is in place and back their vehicle further than they should, resulting in damage to either the hitch/ball mount and/or the object that the ball mount impacts upon.

Various attempts have been made to avoid the foregoing problems. The typical solution involves attaching a ball mount holder somewhere on the vehicle for easy storage of the ball mount. However, this is still problematic in that holders are only specific to certain types of ball mounts. As such, they are unable to accommodate different sizes of ball mounts which may utilize different pin sizes. Therefore, there is a need in the art to provide a ball mount holder assembly that is adaptable to mount to different structures and adaptable to carry different types of removable ball mounts.

SUMMARY OF THE INVENTION

In light of the foregoing, it is a first aspect of the present invention to provide a hitch holder assembly.

It is another aspect of the present invention to provide a hitch holder assembly for mounting to a carrying device, comprising a body having opposed sides, a stake flange extending substantially perpendicularly from one of the opposed sides, the stake flange adapted to be secured to a vehicle, and a pin flange extending substantially perpendicularly from an opposite of the opposed sides, the pin flange extending in a direction opposite the stake flange, the pin flange adapted to receive and carry a trailer hitch.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Referring now to the drawings, and in particular to FIGS. 1-5, it can be seen that a ball mount holder assembly according to the concepts of the present invention is designated generally by the numeral 20. In one embodiment the ball mount holder assembly 20 is secured to a truck stake pocket 22 which is the inside wall of a truck bed. In other words, the ball mount holder assembly 20 is secured to a supporting wall that surrounds the door of a flatbed pick-up truck. As will become apparent as the description proceeds, the ball mount holder assembly 20 may be mounted to other surfaces of the towing vehicle or the wheeled trailer that is to be towed.

The ball mount holder assembly 20 includes a body 30 which has a stake flange 32 extending from one edge and a pin flange 34 extending from an opposite side and an opposite edge of the body 30. In other words, the stake flange 32 extends from one side of the body 30 in a first direction and the pin flange 34 extends from an opposite side of the body in a direction opposite the stake flange 32. Skilled artisans will appreciate that the body 30 has a width and thickness that allows for the pin flange 34 to extend in such a manner so as to be substantially removed from interference from either the truck stake pocket or the sidewall of the pick-up truck, or any other interfering surface. In some embodiments, the body is sized so as to provide at least one half the length dimension of the pin flange and to provide for a thickness that is at least double the thickness of either the pin flange or the stake flange.

Extending from the pin flange is a pin 36 wherein the pin 36 is positioned between the body 30 and a flange lip 38 which may extend perpendicularly from the pin flange 34. The flange lip 38 may have a length equivalent to the thickness of the body 30 or may be sized somewhat more or less than the thickness of the body. The space between the flange lip 38 and the body 30 forms a tube cavity 39. As will become apparent, the tube cavity 39 may be sized to accommodate different sizes of hitch holders. In other words, the flange lip 38 may be spaced apart from the body 30 as appropriate to receive a particular size of hitch holder to be received in the tube cavity 39.

The stake flange 32 may include a plurality of mounting holes 42 which receive corresponding fasteners 44. The stake flange 32 extends from one side of the body 30 and is perpendicular to that side. The pin flange 34 extends from the other side of the body 30 in a direction opposite the stake flange 32. The pin flange 34 may have at least one pin hole 48 extending therethrough. As can best be seen in FIG. 2, the back side of the pin flange 34 may provide a counterbore 50 surrounding the pin hole 48. In other words, the bore 50 provides a recess into the pin flange that surrounds the pin hole 48. At least one and in some embodiments a pair of fastener holes 52 may be provided which may be diametrically opposed and extend through the pin flange and in close proximity to each pin hole 48 that may be provided.

In some embodiments, multiple pin holes 48, 48' and corresponding bores 50, 50' may be provided through the pin flange 34, Multiple pin holes 48,48' allow for a user to install the pin in whichever hole meets the ball mount tube size (for example, 1¼", 2", 2½" square) they have. The pin holes and bores can also be sized to accommodate different diameters of pins. Any combination of diameter sizes of holes and number of holes may be provided. It will be appreciated that in some embodiments it is desirable to place a center of the pin hole 48 at a distance ½ the size of the ball mount's insertion end from the flange lip 38. In other words, the pin 36 is positioned from the flange lip so that when the cross-hole through the ball mount end is received on the pin, the mounting tube of the ball mount is positioned closely adjacent to the flange lip 38 and in some instances in touching contact with the flange lip. This close alignment of the mounting tube and the flange lip keeps the tube from rattling and making nose while the vehicle on which it is stored is moving.

Figure 1:
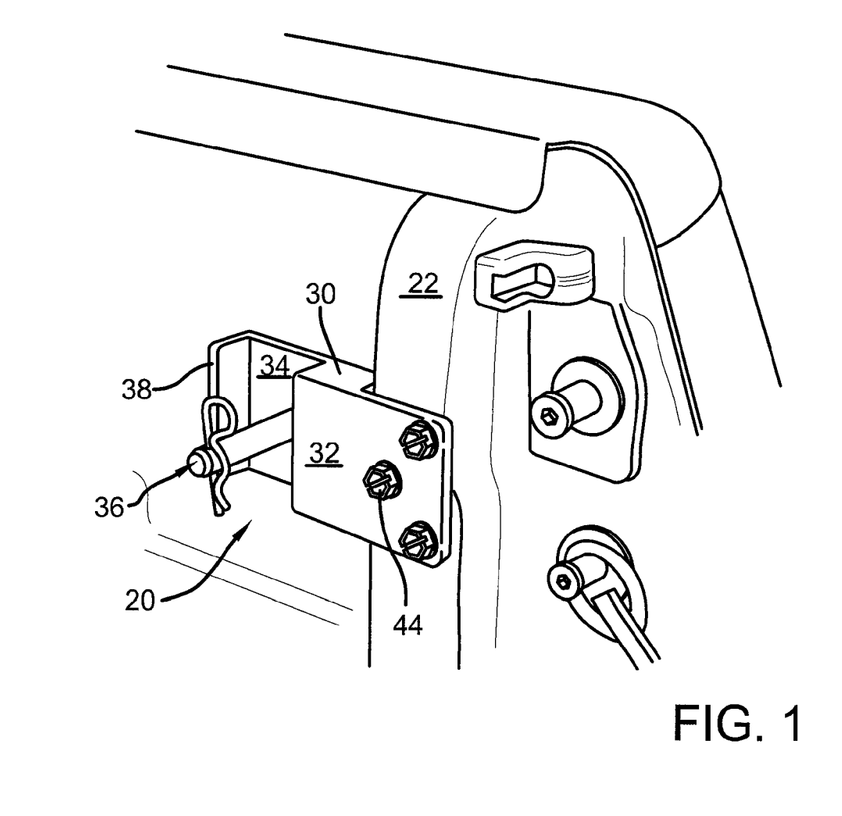
FIG. 1 is a perspective view showing a ball mount holder assembly mounted to pick-up truck bed according to the concepts of the present invention.
Figure 2:
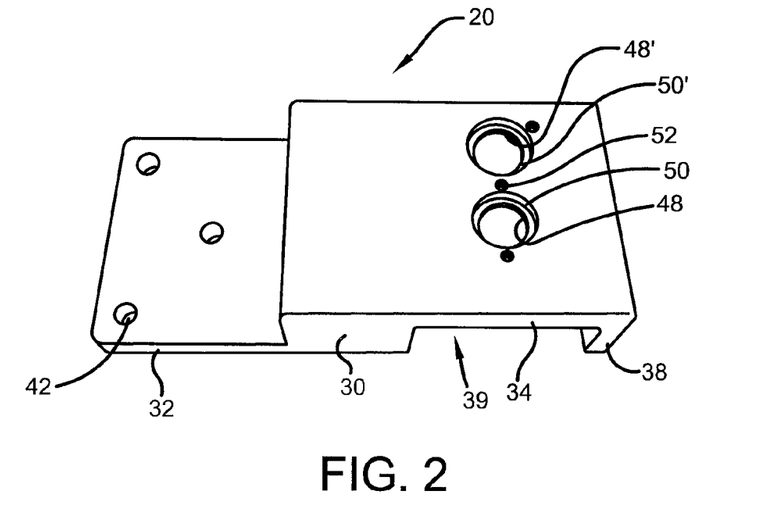
FIG. 2 is a rear view of the ball mount holder assembly according to the concepts of the present invention.
Figure 3:
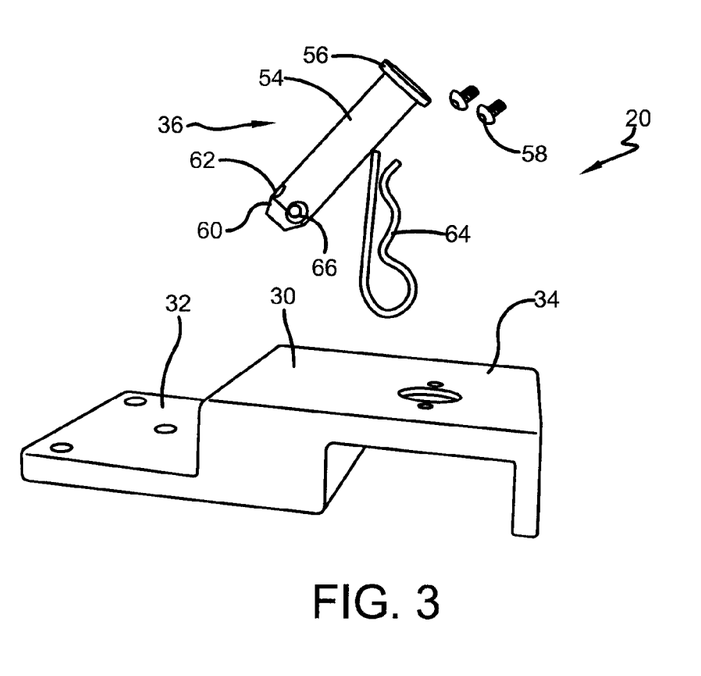
FIG. 3 is a detailed view of a pin utilized with the ball mount holder assembly according to the concepts of the present invention.
Figure 4:
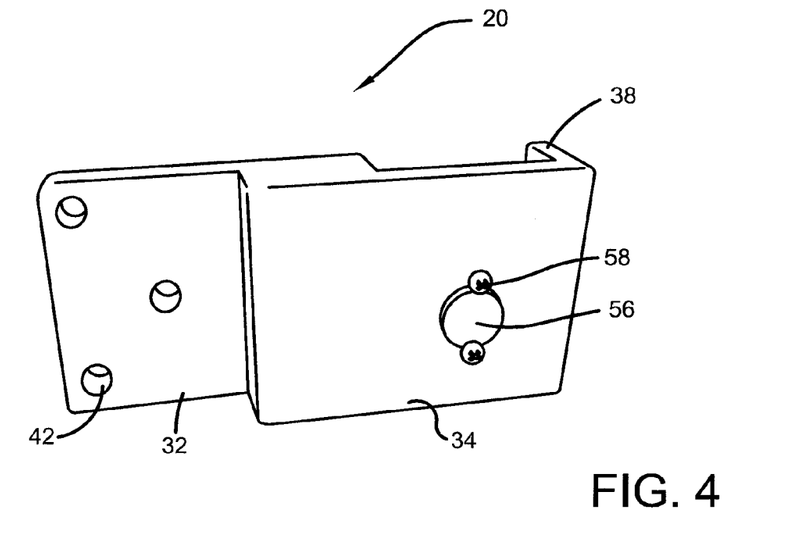
FIG. 4 is a rear view of the ball mount holder assembly with the pin secured thereto.
Figure 5:
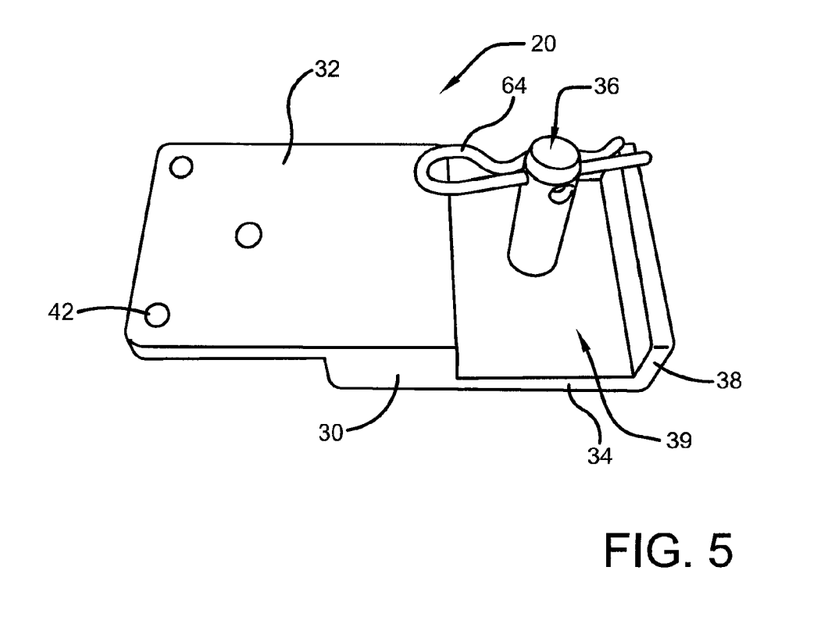
FIG. 5 is a front perspective view showing the pin assembled to the ball mount holder assembly according to the concepts of the present invention.

The pin 36 includes a pin body 54 which can be of different outer diameters depending on the particular hitch utilized. In any event, extending radially from one end of the pin body 54 is a ridge 56 which has an outer diameter larger than the diameter of the pin body 54. The ridge 56 fits into the counterbore 50 and may be flush or extend slightly outwardly from than the back side of the pin flange. As best seen in FIG. 4, a fastener 58 may be received in a corresponding fastener hole 52 so as to hold the ridge 56 and, as a result, the pin body 54 in the pin hole 48. A chamfer 60 is at an end of the pin body 54 opposite the ridge 56. A cotter hole 62 radially extends through the chamfer end 60 so as to receive a cotter pin 64.

The chamfer end 60 also provides a lock hole 66, which in the embodiment shown radially extends through the pin body 54 in a direction perpendicular to the cotter hole 62. Although not required, the cotter hole 62 and the lock hole 66 may intersect with one another. The lock hole is used to receive a lock so as to prevent theft of the ball mount.

Figure 6:
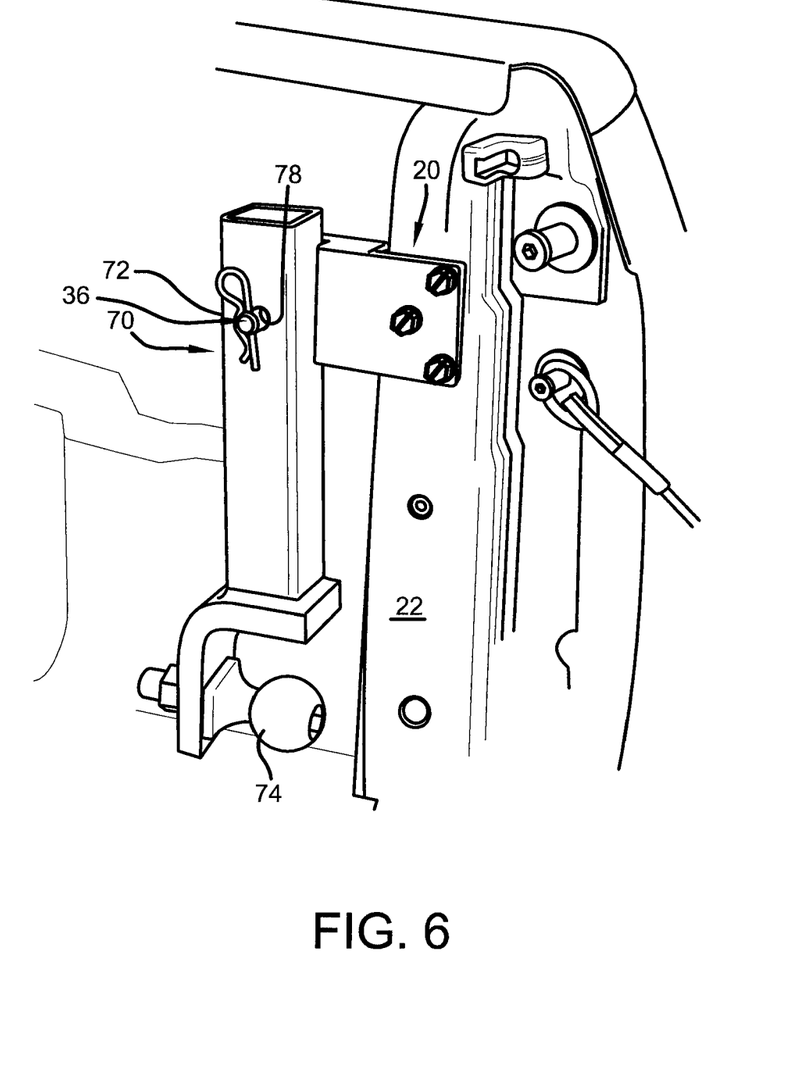
FIG. 6 is a perspective view showing the ball mount holder assembly carrying one embodiment of a ball mount.

Referring now to FIG. 6, it can be seen that a ball mount is designated generally by the numeral 70 and includes a tube 72 which has a mount ball 74 disposed at one end. At the opposite end of the tube 72 is a tube hole 78 which receives the pin 36. As shown, the tube 72 fits within the tube cavity 39 and the mount ball 74 extends in a downward direction. The body 30 is sized such that the tube is displaced from the truck stake pocket 22 and is positioned at a height so as to allow for easy mounting and de-mounting of the trailer hitch from the ball mount holder assembly 20. As previously discussed, the pin 36 may be of different diameters depending upon the construction of the ball mount 70.

Figure 7:
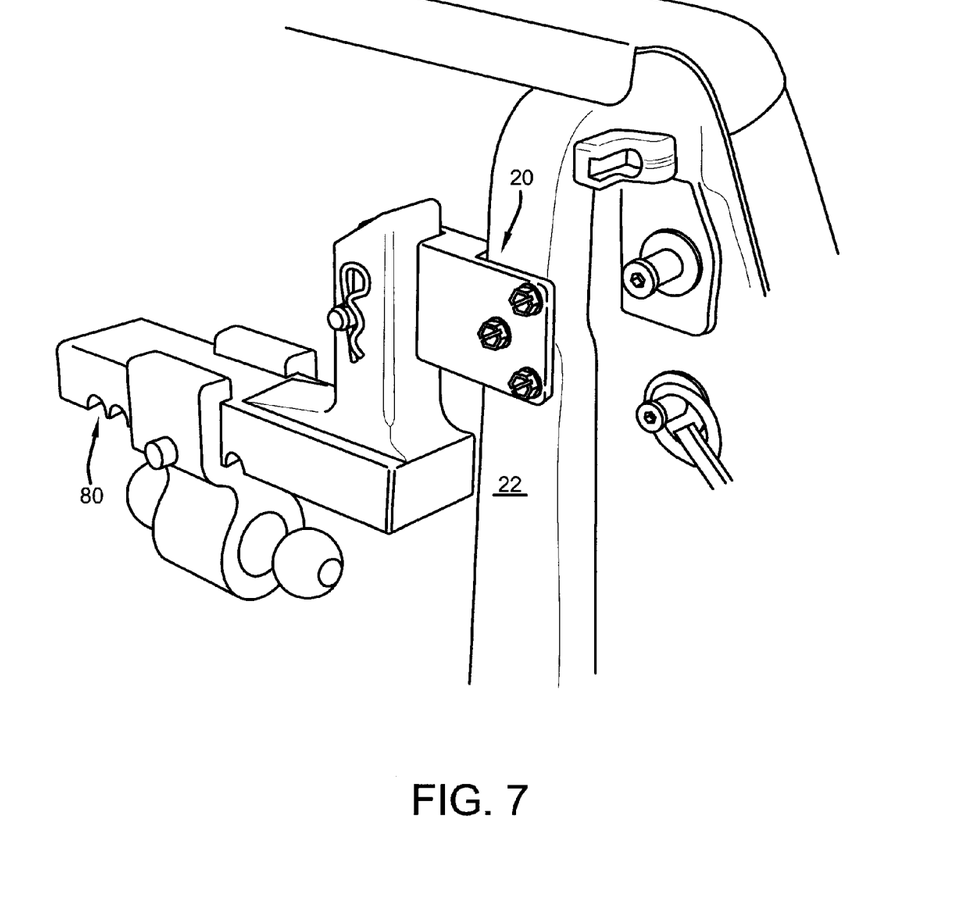
FIG. 7 is a perspective view of the ball mount holder assembly carrying a different embodiment of a ball mount.

Referring now to FIG. 7, another ball mount, designated generally by the numeral 80, is adapted to be received in the ball mount holder assembly 20. As shown, the ball mount holder 80 is oriented so that the tube thereof is oriented perpendicularly. As a result, it is apparent that the sizing of the body, as indicated above, allows for the ball mount holder to be adapted for use with different types of ball mounts.

Figure 8:
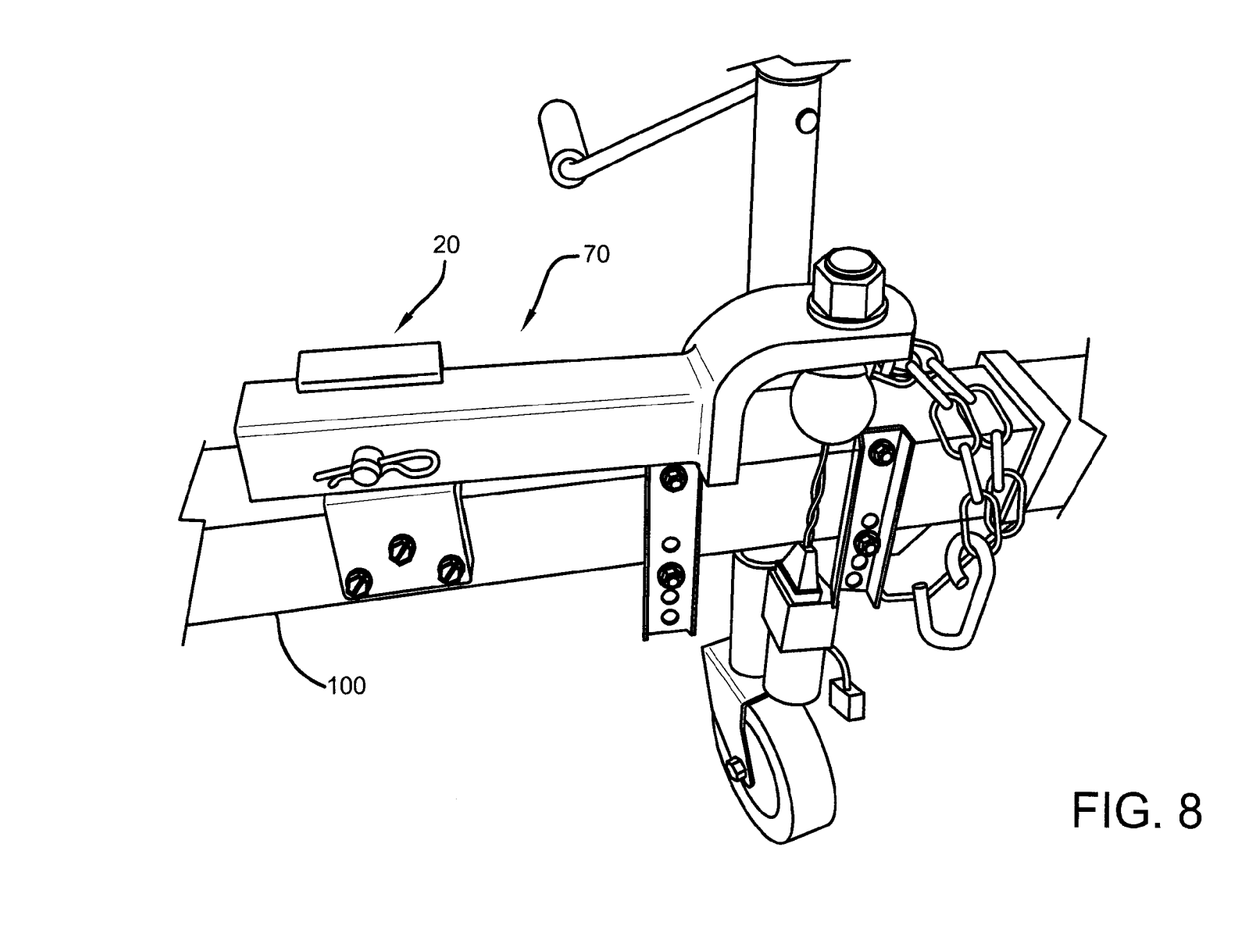
FIG. 8 is a perspective view showing the ball mount holder assembly attached to a trailer according to another embodiment of the present invention.

Referring now to FIG. 8, it can be seen that the ball mount holder assembly 20 may be mounted onto a trailer tube 100. This allows for the ball mount 70 to be mounted lengthwise along the trailer tube for storage purposes. When it is desired to tow the trailer associated with the trailer tube 100, the ball mount 70 is removed from the pin cavity 39 and installed in the trailer tube 100 for towing the wheeled object.

Figure 9:
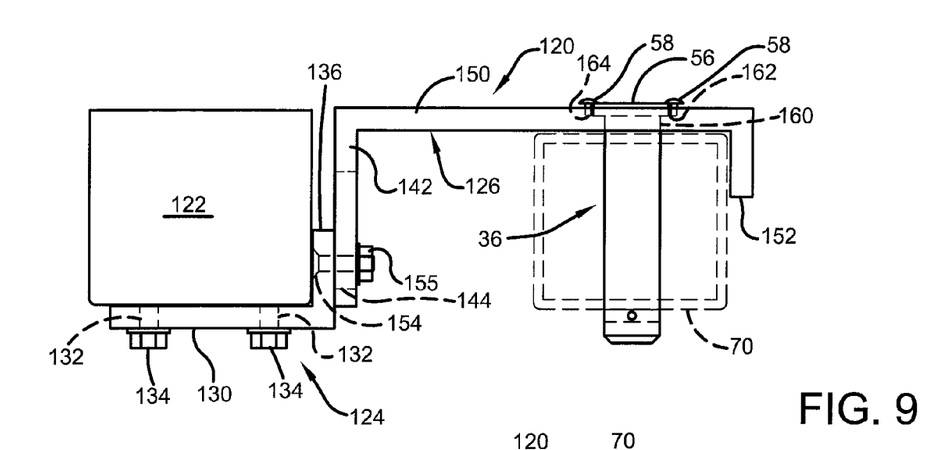
FIG. 9 is a top elevational view of an alternative ball mount holder assembly according to the concepts of the present invention.
Figure 10:
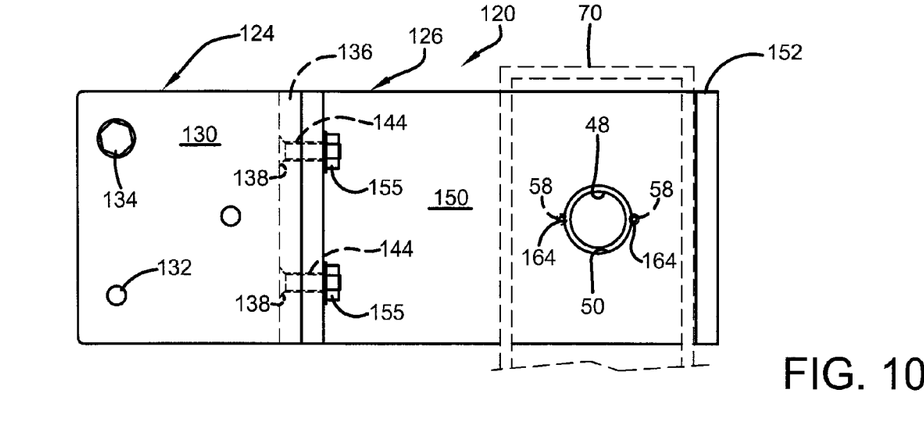
FIG. 10 is an elevational view of the alternative ball mount holder assembly according to the concepts of the present invention.

Referring now to FIGS. 9 and 10, it can be seen that an alternative embodiment ball mount holder is designated generally by the numeral 120. The ball mount holder 120 is secured to a truck stake pocket 122 in a manner similar to that shown in FIG. 6. In this embodiment, the ball mount holder 120 includes a stake flange 124 that is positionally adjustable with respect to a pin flange 126.

The stake flange 124 includes a mount plate 130 which has a plurality of mount holes 132 extending therethrough. Corresponding mount fasteners 134 are received in the holes 132 for securing the stake flange to the truck stake pocket 122 or other appropriate mounting surface. Extending substantially perpendicularly from the mount plate 130 is a stake flange adjustment plate 136 which has a plurality of flange adjustment holes 138 extending therethrough.

The pin flange 126 includes a pin flange adjustment plate 142 which has a pair of pin flange adjustment slots 144 extending therethrough. The pin flange 126 also includes a body 150 that may extend substantially perpendicularly from the pin flange adjustment plate 142. Extending substantially perpendicularly from the body 150, at an end opposite the pin flange adjustment plate 142, is a flange lip 152. As such, a hitch cavity 153 is formed between the flange lip 152 and the pin flange adjustment plate 142. The position, or spacing distance, of the pin flange 126 with respect to the mount plate 130 may be adjusted by fasteners 154 that are received within the flange adjustment holes 138 and which extend through the slots 144. Nuts 155 are secured to the fasteners so as to allow for the pin flange 126 to be held in place with respect to the stake flange 124. Accordingly, depending upon the size of the hitch received in the cavity, the pin flange 126 can be adjusted in either direction so as to accommodate the appropriate size. It will further be appreciated that the pin flange body 150 can be sized to distance the flange lip 152 as needed from the stake pocket 122 of the truck or other surface. In much the same manner as the previous embodiment, the body 150 provides for a pin hole 160 that may provide for a counterbore 162 and appropriate fastener holes 164 which receive a corresponding fastener 58 for securement of the pin to the body 150. As in the previous embodiment, any number of pin holes 48 and corresponding counterbores 150 and any diameter of pin hole may be provided through the pin flange 126 and in particular the body 150.

Figure 11:
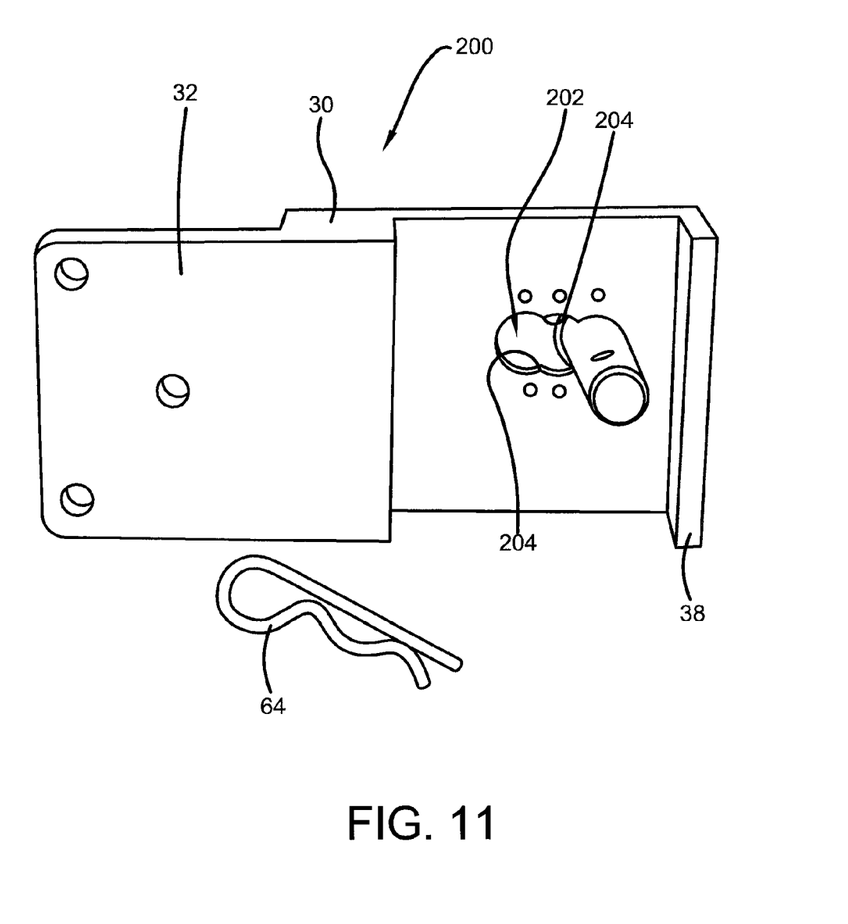
FIG. 11 is a front perspective view of a second alternative embodiment ball mount holder assembly according to the concepts of the present invention.
Figure 12:
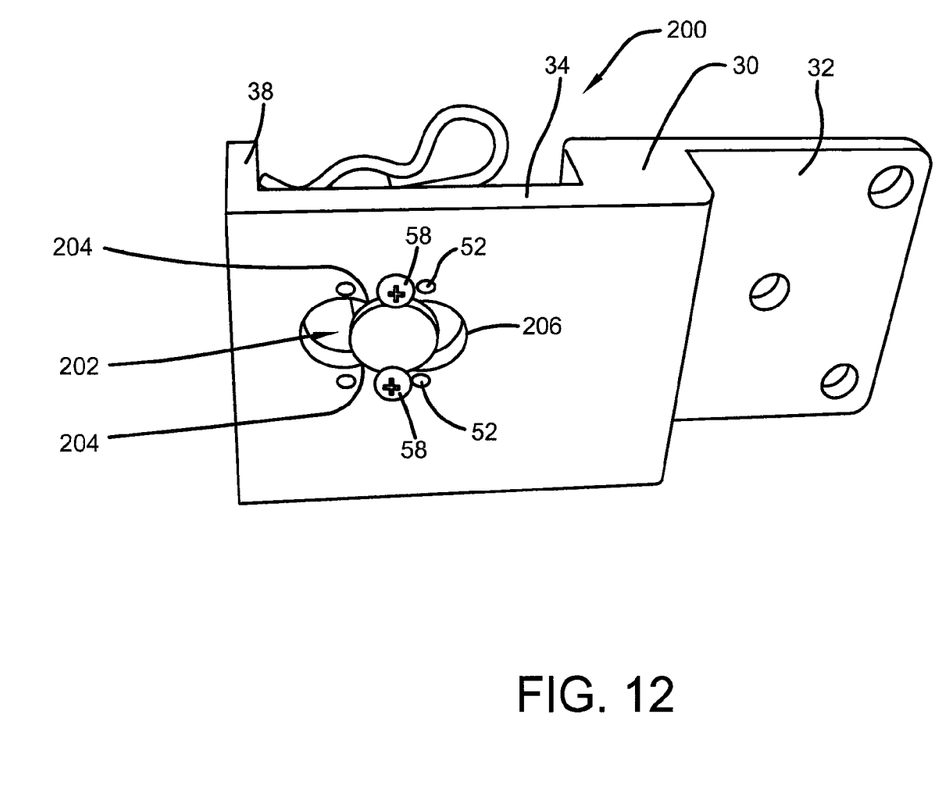
FIG. 12 is a rear view of the second alternative ball mount holder assembly with a pin secured thereto.
Figure 13:
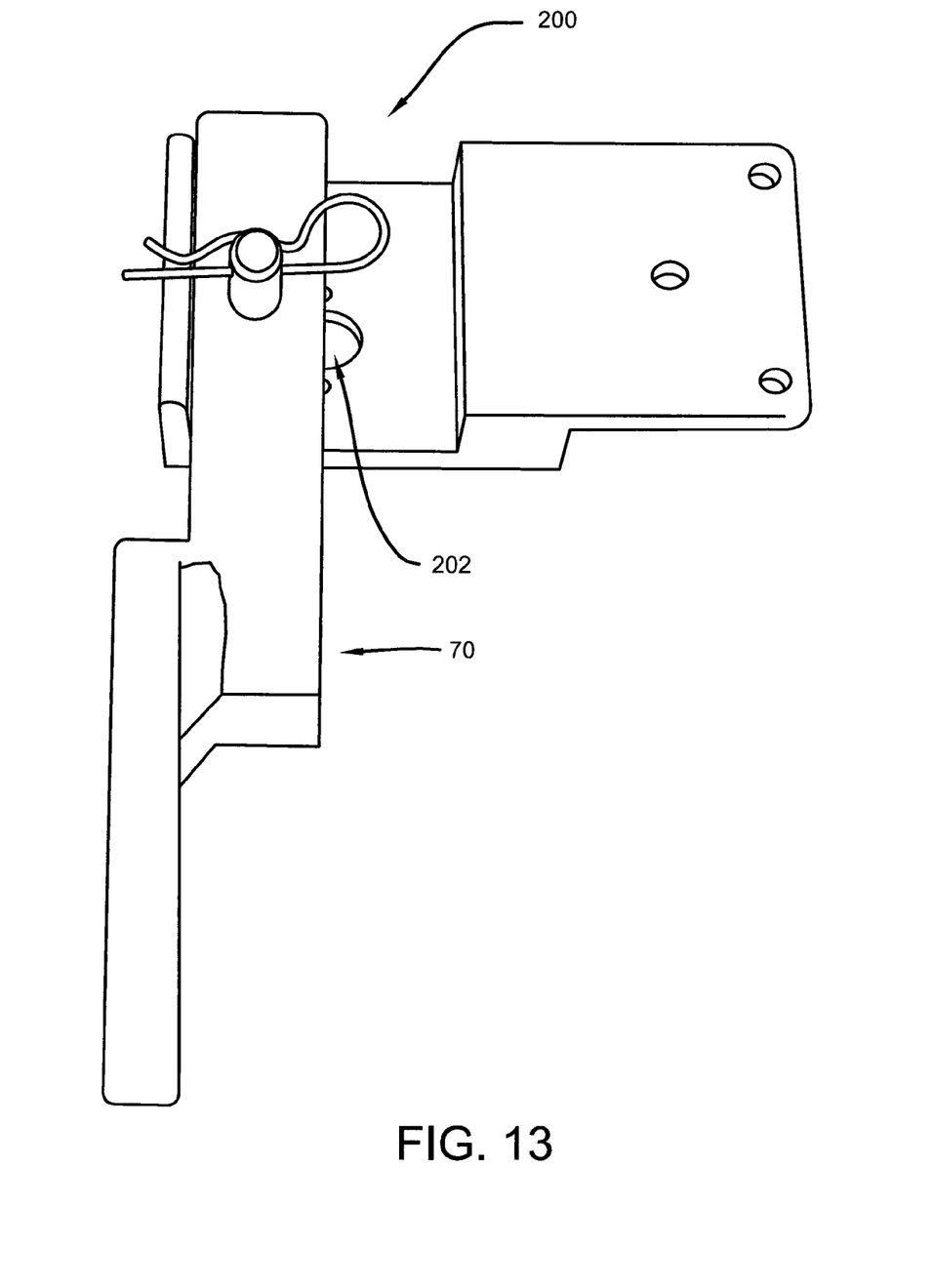
FIG. 13 is a front perspective view of the second alternative ball mount holder assembly with a ball mount secured thereto according to the concepts of the present invention.

Referring now to FIGS. 11-13, it can be seen that an alternative embodiment ball mount holder is designated generally by the numeral 200. This alternative embodiment is substantially the same as the holder shown in FIGS. 1-5 except for the configuration of how the pin is secured to the pin flange. In particular, the pin flange 34 is provided with a slot 202 extending therethrough. A corresponding back surface of the pin flange 34 may have a counterbore surface 206 that extends about the outer periphery of the slot 202. The counterbore surface, as in the other embodiment, may receive a flange 56 of the pin 36. The slot is sized to provide for receipt of a pin in three different locations within the slot. It will be appreciated that there are three standard sizes of hitch tubes to be carried by the holder assembly and, as such, there are three optimal locations for securing the pin to the pin flange. To accomplish this, the slot is provided with three centers for each distance away from the flange lip 38. Accordingly, a 1¼" mounting tube will be attached to a pin which has a center that is ¾" from the proximal edge of the flange lip 38. Likewise, the 2" square mounting tube will be positioned at a center position 1" from the edge of the flange lip 38, and the 2½" mounting tube will have a pin center position 1¼" from the edge of the flange lip 38. The slot is configured such that the pin hole diameters overlap one another so as to form opposed spurs 204 at the appropriate spot. As such, the spurs prevent the pin body from freely moving from one end of the slot to another. In other words, the spurs 204 function to maintain the center position for each hole to accommodate a pin. Accordingly, although the fasteners 58 hold the pin in place in the desired position within the slot, the opposed spurs 204 further facilitate securement of the pin in a desired location. Skilled artisans will appreciate that such a configuration eliminates the need to have multiple holes in the pin flange while still providing a secure reception of the pin to hold the appropriately sized mounting tube in place.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A ball mount holder assembly for carrying a ball mount in a non-operative position wherein the ball mount has a hole therethrough, and wherein the assembly is mountable to a carrying device, the assembly comprising:
   a body having opposed sides;
   a stake flange extending substantially perpendicularly from one of said opposed sides, said stake flange adapted to be secured to the carrying device;
   a pin flange extending substantially perpendicularly from an opposite one of said opposed sides, said pin flange extending in a direction opposite said stake flange; and
   a pin extending substantially perpendicularly from said pin flange in a same direction as said body, said pin sized to be received in the hole of the ball mount so that said pin flange and said pin can receive and carry the ball mount in a non-operative position.

2. The ball mount holder assembly according to claim 1, wherein said pin flange has a pin hole extending therethrough and a counterbore disposed about said pin hole, said pin flange having fastener holes; and
   wherein said pin has a pin ridge received in said counterbore.

3. The ball mount holder assembly according to claim 2, wherein fasteners are received in said fastener holes and secure said pin to said pin flange.

4. The ball mount holder assembly according to claim 1, further comprising:
   a flange lip extending substantially perpendicularly from said pin flange at an edge away from said body so as to form a hitch cavity between said body and said flange lip.

5. The ball mount holder assembly according to claim 1, wherein said body comprises:
   a stake flange adjustment plate extending from said stake flange, and a pin flange adjustment plate extending from said pin flange, said adjustment plates detachably secured to one another as to accommodate receipt of various size trailer hitches in the carrying device.

6. The ball mount holder assembly according to claim 1, wherein the carrying device is selected from the group consisting of a truck, a trailer, and a wall.

7. The ball mount holder assembly according to claim 1, wherein said pin flange has a plurality of pin holes extending therethrough wherein one of said plurality of pin holes receives said pin.

8. The ball mount holder assembly according to claim 7, wherein said plurality of pin holes are of different diameter.

9. The ball mount holder assembly according to claim 1, wherein said pin flange has a slot extending therethrough so as to receive said pin in different positions.

10. The ball mount holder assembly according to claim 9, further comprising:
    a flange lip extending substantially perpendicularly from said pin flange at an edge away from said body so as to form a hitch cavity between said body and said flange lip, wherein said pin is positioned at one of selected predetermined distances from said flange lip.

11. The ball mount holder assembly according to claim 10, wherein said slot has opposed spurs to preclude lateral movement of said pin from one position to another within said slot.

\* \* \* \* \*